United States Patent [19]

Soulard

[11] Patent Number: 4,750,898

[45] Date of Patent: Jun. 14, 1988

[54] ANTI-TAMPER SHROUD FOR CABLE CONNECTOR

[75] Inventor: Roger R. Soulard, Dracut, Mass.

[73] Assignee: Wang Laboratories, Inc., Lowell, Mass.

[21] Appl. No.: 44,372

[22] Filed: Apr. 30, 1987

[51] Int. Cl.⁴ .......................................... H01R 13/639
[52] U.S. Cl. ...................................... 439/301; 439/133
[58] Field of Search ............... 439/133, 134, 149, 301, 439/304, 308

[56] References Cited

U.S. PATENT DOCUMENTS

| | | | |
|---|---|---|---|
| 2,415,602 | 2/1947 | Monaco | 439/149 |
| 2,709,198 | 5/1955 | Holtshouser | 439/133 |
| 4,168,921 | 9/1979 | Blanchard | 439/133 |
| 4,603,931 | 8/1986 | Ruffman | 439/133 |
| 4,640,107 | 2/1987 | Slade | 439/133 |
| 4,674,813 | 6/1987 | Feldner | 439/133 |

Primary Examiner—John McQuade
Attorney, Agent, or Firm—Michael H. Shanahan

[57] ABSTRACT

A clamp holds a sleeve over an installed connector preventing access to the connector for removal. The clamp is clamped to a cable with a screw having a head that breaks off after installation.

5 Claims, 1 Drawing Sheet

U.S. Patent  Jun. 14, 1988  4,750,898
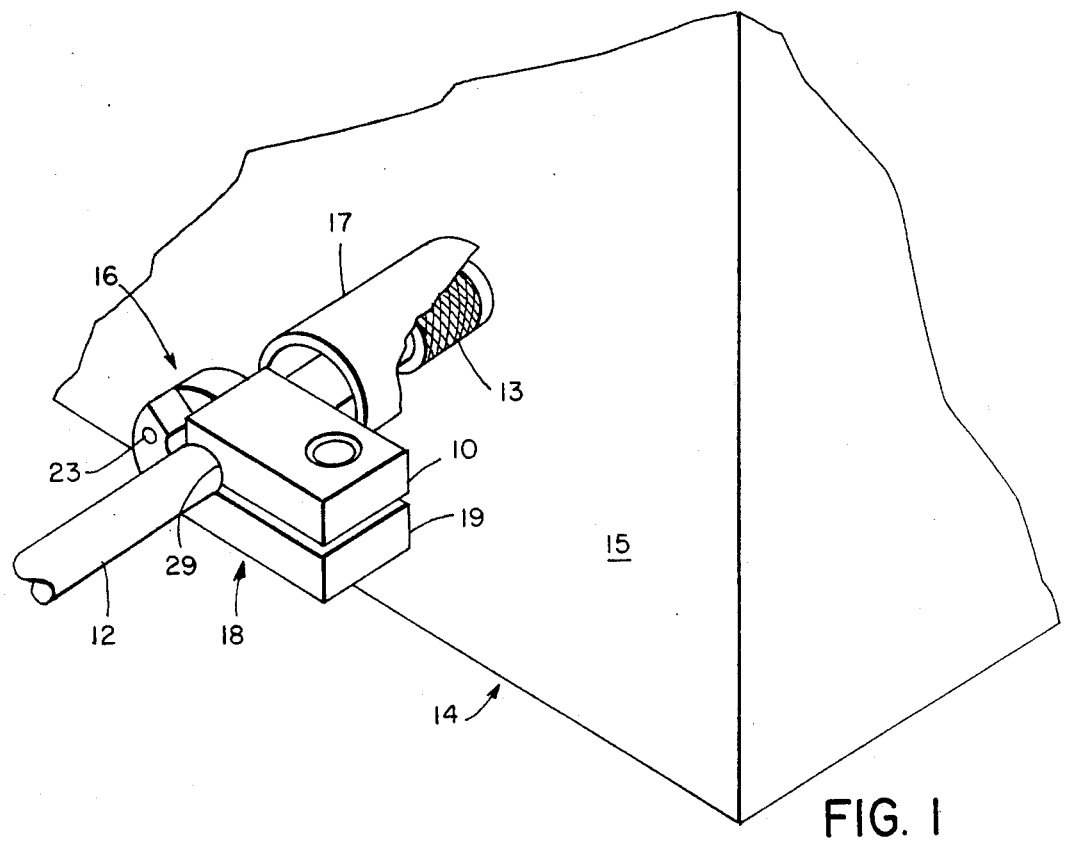
FIG. 1
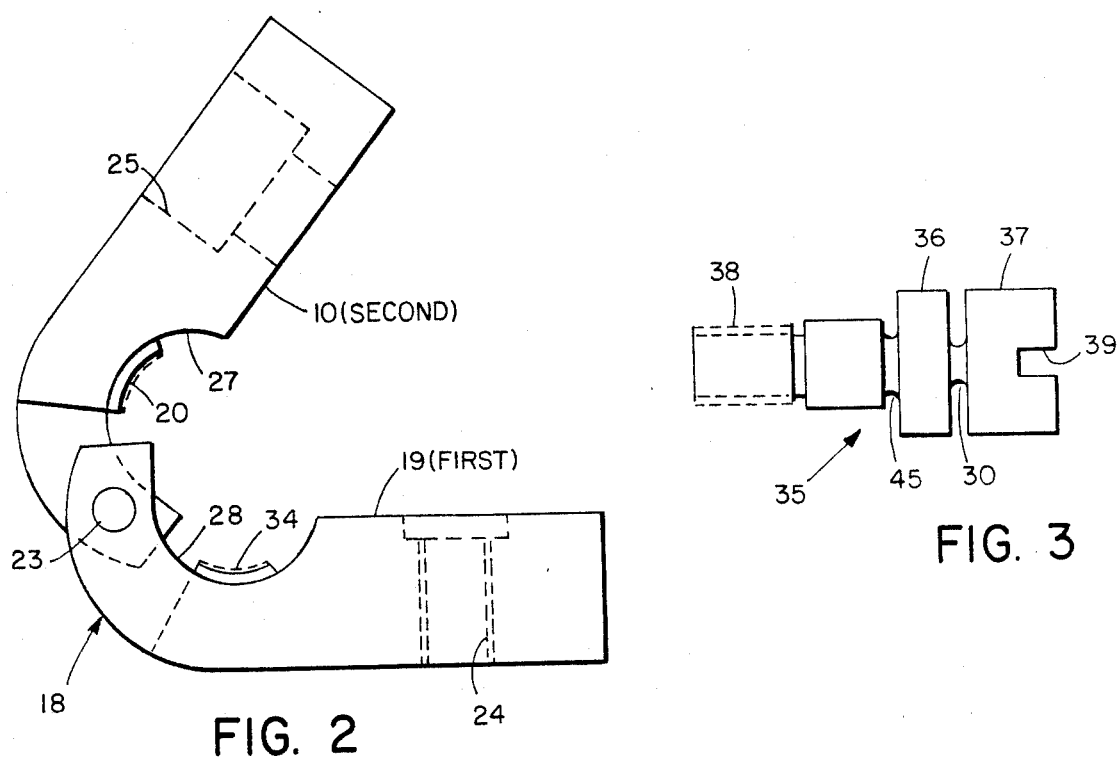
FIG. 2
FIG. 3

ANTI-TAMPER SHROUD FOR CABLE CONNECTOR

BRIEF SUMMARY OF THE INVENTION

Computer components are frequently interconnected through coaxial cables to form a system. The cables used are commonly terminated in BNC or TNC connectors which are connected to mating parts affixed to walls of the components. These connectors require a rotation of an outer member to effect connection or disconnection from the component, and this rotation is easily done by twisting the outer member with the fingers.

It is sometimes, however, desirable to prevent the casual or unauthorized disconnection of cables by operators or office staff to maintain a definite system configuration or to prevent unauthorised use of the computer system. This invention provides a shroud which is locked in place on the connected cable and which covers and denies access to the connector member which must be rotated to effect disconnection of the cable, thus preventing casual disconnection. The shroud is clamped to the cable and locked in place by tightening a specially formed screw. After the screw is tightened to affix the shroud, further tightening of the screw breaks off a distal head carrying the screw driving slot and leaving a proximal head wholly recessed within a cavity of the clamp mechanism. The removal of the distal screw head leaves the screw without any means for untightening.

If it becomes necessary to remove the connector in order to reconfigure the system or to effect repairs, the screw locking the shroud in place can be broken to give access to the connector. This would ordinarily be done by qualified maintenance personnel, and if done by unauthorized personnel would leave a plainly observable indication of the tampering.

BRIEF DESCRIPTION OF THE DRAWING

FIG. 1 shows a shroud according to the invention installed on a connector cable connected to an electronic cabinet.

FIG. 2 shows in detail a clamp, which is a part of the shroud of FIG. 1.

FIG. 3 shows in detail a tightening screw, which is a part of the shroud of FIG. 1.

DETAILED DESCRIPTION

Referring to the Figures, coaxial cable 12 terminated by connector 13 is connected to a computer component 14 through a mating plug in wall 15. Anti-tamper shroud 16, according to the invention, includes sleeve retaining clamp 18, and sleeve 17 encircling cable 12 and covering connector 13.

Sleeve retaining clamp 18 has a first element 19 and a second element 10 hinged together with pin 23, which is advantageously press fit into a blind hole. First element 19 has a threaded hole 24 with left handed threads, and second element 10 has counterbored hole 25 which, when clamp 18 is closed, is opposed to threaded hole 24. Cable channel wall 27 on element 10 and cable channel wall 28 on element 19 together, when clamp 18 is closed, define cable channel 29 with ridges 20 and 34 lying within the channel.

Clamp tightening screw 35, shown particularly in FIG. 3, includes threaded portion 38 with a left handed tread, proximal head 36, and distal head 37. Distal head 37 carries a screw driver slot 39 or other tool engaging means and is connected to proximal head 36 through rupture neck 30 and proximal head 36 is connected to the threaded end of the screw by second neck 45. Rupture neck 30 has the smallest diameter of any point along screw 35 and is consequently breakable at a lower torque than any other cross section of the screw.

The operation of the anti-tamper shroud is as follows. prior to connecting cable 12 to equipment 14, sleeve 17 is placed around the cable. Connector 13 is then connected to its mating plug in the conventional way. Sleeve 17 is then slid along cable 12 until it abuts wall 15 and covers connector 13. Clamp 18 is then closed around cable 12 and abutting sleeve 17, and tightened with screw 35. After screw 35 has been tightened to affix clamp 16 to cable 12 it is further tightened to break off distal head 37 and leave clamp 18 secured by proximal head 36, which is now wholly within counterbore 25. Since the tool engagement slot on head 37 has been removed there is no way to back off the screw, and because the hinge pin 23 is seated in a blind hole there is no way to unpin the hinge.

If for some reason it becomes necessary to disconnect the cable, a prying action between elements 19 and 10 of the clamp will snap off head 36 at neck 45, permitting opening of the clamp and leaving stud 46 protruding from element 19. The remains of the screw can then be removed with a pliers. After reinstallation of the cable the shroud can be reused with a new screw.

I claim:

1. An anti-tamper shroud for preventing covert disconnection of a cable connected to a piece of equipment through a terminating connector, comprising a sleeve shaped and sized to encircle said cable and to slide over and completely cover said connector, a sleeve retaining claim including first and second elements hinged together which, when closed about said cable, provide a channel through which cable passes, said retaining clamp having a threaded hole in the first of said elements and an opposed counterbored hole in the second of said elements, a tightening screw for tightening said clamp, said screw having a threaded portion for engaging the first element of said clamp and a proximal head proximal to said threaded portion sized to enter into and engage the bottom of the counterbored hole of said second clamp element, and a distal head with tool engaging means for engaging a tool, said distal and proximal heads being connected through a rupture neck which is breakable at a lower torque than any other part of said screw, said retaining clamp and said screw being sized and shaped so that when the clamp is tightened by said screw in its operating position surrounding a cable and abutting said sleeve the screw assumes a position with said proximal head wholly within said counterbore and said clamp is effective to bind to the cable in said channel and block withdrawal of said sleeve from a position covering said connector, said screw when over tightened in its operating position breaking at said rupture neck to sever said distal head from the remainder of the screw and remove said tool engaging means from the screw.

2. An anti-tamper shroud as claimed in claim 1, including a ridge lying within said channel for pressing into said cable.

3. An anti-tamper shroud as claimed in claim 1, wherein hinging of said first and second elements is effected by a pin press fit into a blind hole.

4. An anti-tamper shroud as claimed in claim 1, wherein treaded portions of said screw and the first element are of left chirality.

5. An anti-tamper shroud as claimed in claim 1, wherein the proximal head of said screw is joined to the threaded portion through a second neck stronger than the rupture neck.

* * * * *